US008251186B2

(12) United States Patent
Webster et al.

(10) Patent No.: US 8,251,186 B2
(45) Date of Patent: Aug. 28, 2012

(54) MOUNTING COMPONENTS WITHIN AN ELEVATOR

(75) Inventors: Robert L. Webster, Porter, TX (US); Alessandro Cercone, Woodland Park, NJ (US); Danny William Girgis, Old Bridge, NJ (US)

(73) Assignee: Inventio AG, Hergiswil NW (CH)

( * ) Notice: Subject to any disclaimer, the term of this patent is extended or adjusted under 35 U.S.C. 154(b) by 0 days.

(21) Appl. No.: 12/842,455

(22) Filed: Jul. 23, 2010

(65) Prior Publication Data

US 2012/0018598 A1 Jan. 26, 2012

(51) Int. Cl.

| | |
|---|---|
| ***B66B 11/02*** | (2006.01) |
| ***B66B 7/04*** | (2006.01) |
| ***F16M 11/00*** | (2006.01) |
| ***B21D 39/03*** | (2006.01) |
| *B23P 11/00* | (2006.01) |

(52) U.S. Cl. ........ 187/409; 187/401; 187/410; 248/201; 29/428; 29/525.02

(58) Field of Classification Search .................. 187/409, 187/410, 401, 414; 248/201; 29/428, 525.02, 29/525.11; *B66B 7/02, 7/04, 11/02, 11/00*
See application file for complete search history.

(56) References Cited

U.S. PATENT DOCUMENTS

| | | | | |
|---|---|---|---|---|
| 3,329,240 | A * | 7/1967 | Harwood et al. | 187/410 |
| 3,856,117 | A * | 12/1974 | Solymos | 187/406 |
| 4,271,932 | A * | 6/1981 | Klein | 187/409 |
| 5,117,946 | A * | 6/1992 | Traktovenko et al. | 187/410 |
| 6,345,698 | B1 | 2/2002 | Ravishankar | |
| 6,698,138 | B1 * | 3/2004 | Lin | 49/409 |

FOREIGN PATENT DOCUMENTS

| | | | |
|---|---|---|---|
| JP | 01271385 | A * | 10/1989 |
| JP | 03177287 | A * | 8/1991 |
| JP | 08217361 | A * | 8/1996 |
| JP | 2006103896 | A * | 4/2006 |
| JP | 2007326691 | A * | 12/2007 |
| JP | 2010149946 | A * | 7/2010 |
| WO | 2010052364 | A1 | 5/2010 |

* cited by examiner

*Primary Examiner* — Michael Mansen
*Assistant Examiner* — Stefan Kruer
(74) *Attorney, Agent, or Firm* — Fraser Clemens Martin & Miller LLC; William J. Clemens

(57) ABSTRACT

A method and an adapter kit for fastening a first elevator component to a second elevator component. The kit comprises a first bracket having two opposing walls interconnected by a web configured for attachment to the first component wherein a slot extending parallel to the web is provided in each of the opposing walls. A second and a third bracket is provided each having two opposing walls interconnected by a web wherein a slot is provided in the web extending between the two opposing walls. The second and third brackets are mountable to the second component by their respective slots. The first bracket is mountable to the second and third brackets by the slots in its opposing walls when the first bracket is positioned such that its opposing walls lie adjacent to the opposing walls of the second and third brackets, respectively.

4 Claims, 6 Drawing Sheets

MOUNTING COMPONENTS WITHIN AN ELEVATOR

FIELD OF THE INVENTION

The present invention relates to a method and an adapter for mounting a first elevator component to a second elevator component and the resultant elevator installation derived therefrom.

BACKGROUND OF THE INVENTION

In a conventional elevator installation, the elevator car is supported within a structural frame. Guides in the form of roller guides or guide shoes are mounted by a series of bolts to each corner of the structural frame to engage with opposing guide rails mounted along the hoistway and thereby guide the car smoothly as it travels through the hoistway. Similarly, the counterweight is normally contained within a structural frame having guides mounted at each corner to engage with opposing guide rails.

During modernization of an existing elevator, it is often necessary for the technician to replace the guides on the car and/or the counterweight frames. However, the existing bolt hole pattern left behind in the structural frame after removal of the existing guide might not match the bolt hole pattern required by the new guide. Hence, before the modernization can commence, the technician needs to visit the installation to determine the existing bolt hole pattern by either identifying the existing guide or by actual measurement. Thereafter, on a case by case basis, an adapter plate is manufactured to interface the new guide with the existing bolt hole pattern.

SUMMARY OF THE INVENTION

There is, therefore, a need for a universal adapter and an associated method to enable a technician to mount a elevator guide to a wide diversity of bolt hole arrangements provided in an elevator frame and, additionally, for an adapter that enables adjustment of the position of the guide relative to the frame in two mutually perpendicular directions before final fixation.

One aspect of the invention involves a method for mounting an elevator guide to an elevator frame comprising the steps of providing a first bracket having two opposing walls and an interconnecting web wherein each of the opposing walls has a slot aligned in a first direction towards a guide rail, mounting a guide to the web of the first bracket, providing a second bracket having two opposing walls and an interconnecting web with a slot provided therein extending in a second direction perpendicular to the first direction, aligning the second bracket so that its slot overlaps holes in the elevator frame, adjusting the second bracket in the second direction, fastening the second bracket through its slot to the holes in the frame, positioning the first bracket such that its opposing walls lie adjacent to the opposing walls of the second bracket, adjusting the first bracket in the first direction, and fastening the first bracket to the second bracket through the slots in the opposing walls of the first bracket.

The method may further comprise the steps of providing a third bracket having two opposing walls and an interconnecting web with a slot provided therein extending in the second direction, aligning the second and third brackets so that they are spaced apart in the first direction, and repeating for the third bracket all steps defined in relation to the second bracket.

Accordingly, the slots in the first bracket permit the adjustment in the first direction of the first bracket relative to the second and third brackets, whereas the slots in the second and third brackets permit adjustment in the second direction relative the frame.

Advantageously, the second and third brackets are initially only loosely fastened through their slots to the holes in the frame and subsequently the first bracket is position such that its opposing walls lie adjacent to the opposing walls of the second and third brackets, respectively and the first bracket is moved in the second direction to ensure correct alignment of the guide with the associated rail after which the second and third brackets are fastened securely through their slots to the existing holes in the frame.

One aspect of the invention involves an elevator installation comprising a frame for movement along guide rails, a plurality of guides to engage with the guide rails, and a plurality of adapter kits to mount the guides to the frame. Each adapter kit comprises a first bracket having two opposing walls and an interconnecting web configured for attachment to a guide wherein each of the opposing walls has a slot aligned in a first direction towards a guide rail and a second bracket having two opposing walls and an interconnecting web with a slot provided therein extending in a second direction perpendicular to the first direction. The second bracket is fastened through its slot to holes in the frame. The opposing walls of the first bracket lie adjacent to the opposing walls of the second bracket. The first bracket is fastened through the slots in its opposing walls to the second bracket.

The elevator installation may further comprise a third bracket having two opposing walls and an interconnecting web with a slot provided therein extending in the second direction wherein the second and third brackets are spaced apart in the first direction.

Furthermore, the elevator installation may further comprise projections extending from the web of the first brackets defining a channel therebetween to at least partially accommodate the associated guide rail. Thereby, the adapter kits seismically retain the frame on the guide rails even in the event of an earthquake.

One aspect of the invention provides an adapter kit for fastening a first component to a second component, comprising a first bracket having two opposing walls interconnected by a web configured for attachment to the first component wherein a slot extending parallel to the web is provided in each of the opposing walls and a second bracket having two opposing walls interconnected by a web wherein a slot is provided in the web extending between the two opposing walls. The second bracket is mountable to the second component by means of its slot, and the first bracket is mountable to the second bracket by means of the slots in its opposing walls when the first bracket is positioned such that its opposing walls lie adjacent to the opposing walls of the second bracket.

The adapter kit may further comprise a third bracket having two opposing walls interconnected by a web wherein a slot is provided in the web extending between the two opposing walls, wherein the third bracket is mountable to the second component by means of its respective slot and the first bracket is mountable to the second and third brackets by means of the slots in its opposing walls when the first bracket is positioned such that its opposing walls lie adjacent to the opposing walls of the second and third brackets, respectively.

Accordingly, the slots in the first bracket permit the lateral adjustment of the first bracket relative to the second and third brackets, whereas the slots in the second and third brackets permit transverse adjustment relative the second component.

Preferably, each slot in the second and third brackets is offset from the center of its respective web. This permits a greater adjustment range. Similarly, each hole in the opposing walls of the second and third bracket may be offset from the center of the respective opposing wall.

Preferably, the first bracket is designed so that its opposing walls can lie adjacent but external to the opposing walls of the second and third brackets. Alternatively, the first bracket may be designed so that its opposing walls can lie adjacent but internal to the opposing walls of the second and third brackets.

DESCRIPTION OF THE DRAWINGS

The novel features of the invention are set out in the claims below. The invention itself, however, as well as other features and advantages thereof, are best understood by reference to the detailed description, which follows, when read in conjunction with the accompanying drawings, wherein:

DESCRIPTION OF THE PREFERRED EMBODIMENT

Figure 1:
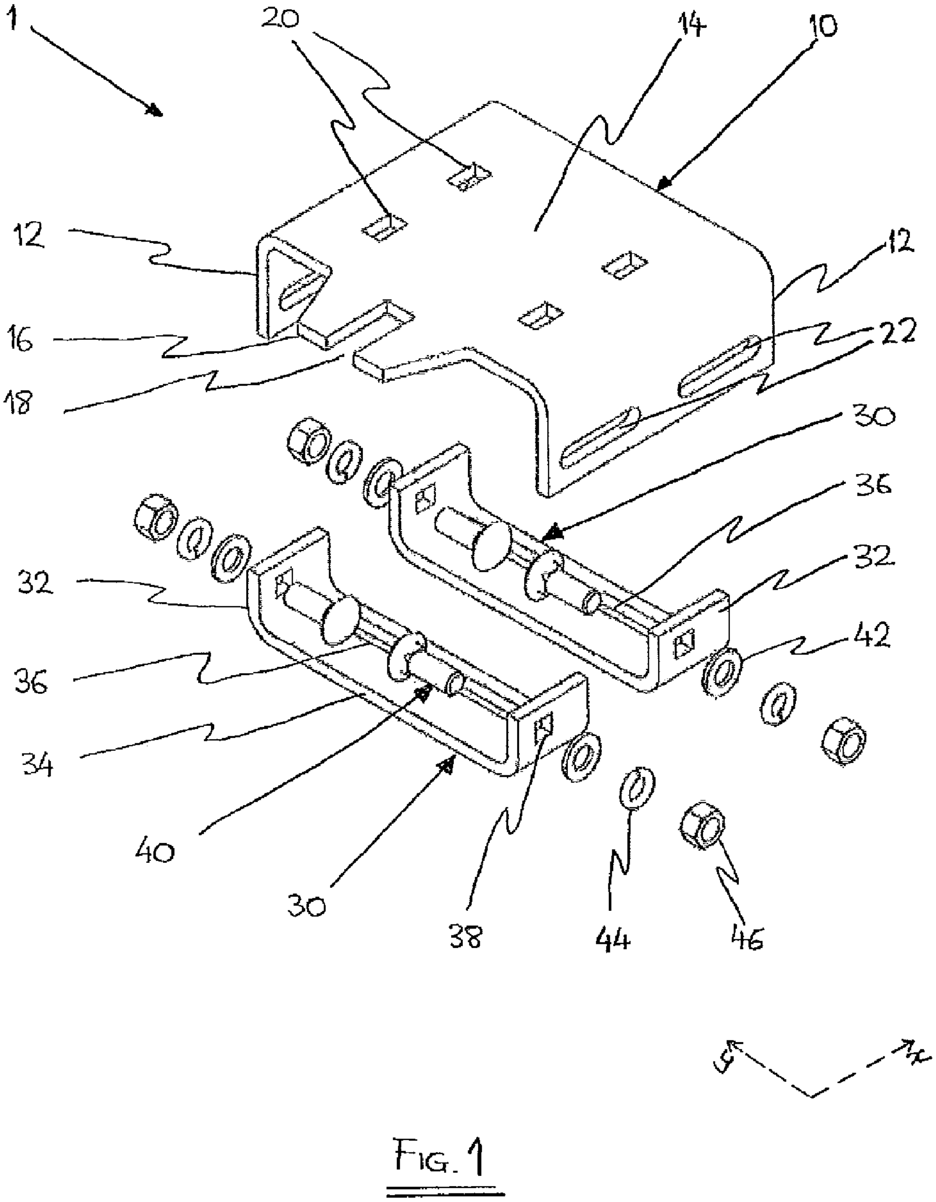
FIG. 1 is a perspective view of one embodiment of an adapter kit.

FIG. 1 schematically illustrates a perspective view of one embodiment of an adapter kit 1 configured to interface a new roller guide with an existing bolt hole pattern in an upper cross beam of an car frame of an elevator installation. The adapter kit 1 comprises an n-shaped upper bracket 10 and two u-shaped lower brackets 30.

The n-shaped upper bracket 10 is formed by two opposing walls 12 interconnected by a web 14. Two projections 16 extend from the web 14 defining a channel 18 therebetween. As explained in further detail with respect to FIG. 2, in use, the channel 18 accommodates a guide rail. A plurality of bolt holes 20 is provided in the web 14 for attachment to the new roller guide. Furthermore, two elongate slots 22 in direct alignment are provided in each of the opposing walls 12 of the n-shaped bracket 10 so as to extend parallel to the web 14.

As with the upper bracket 10, each of the u-shaped lower brackets 30 is formed by two opposing walls 32 interconnected by a web 34. Two directly aligned elongate slots 36 extending between the opposing walls 32 are provided in the web 34 of each of the lower brackets 30 to enable attachment of the lower brackets 30 to the upper cross beam of the elevator car frame. A bolt hole 38 is provided in each of the opposing walls 32 of each of the lower brackets 30. Preferably, the elongate slots 36 are offset from the center of the web 34. Similarly, the bolt holes 38 are preferably offset from the center of the opposing walls 32.

In use, the upper bracket 10 is lowered over the lower brackets 30 so that the opposing walls 12 of the upper bracket 10 lie adjacent but external to the opposing walls 32 of the lower brackets 30, respectively. Carriage bolts 40 are then introduced through the four bolt holes 38 in the opposing walls 32 of the lower brackets 30 and subsequently through the elongate slots 22 in the opposing walls 12 of the upper bracket 10. Accordingly, transverse relative movement (along the y-direction in the drawing) between the upper and lower brackets is prevented since the opposing walls 32 of the lower brackets 30 are enclosed by the opposing walls 12 of the upper bracket 10. However, the engagement of the carriage bolts 40 with the bolt holes 38 and the elongate slots 22 enables the upper bracket 10 to slide laterally (along the x-direction in the drawing) relative to the lower brackets 30. Once the upper bracket 10 is in the required lateral position, a washer 42, a lock washer 44 and a hex nut 46 are introduced to each of the carriage bolts 40 to fasten and secure the upper bracket 10 to the lower brackets 30.

Use of the adaptor kit 1 to interface a new roller guide 200 with an existing bolt hole pattern 104 in an upper cross beam 102 of an car frame 100 of an existing elevator installation 400 will be explained in detail in association with FIGS. 2 and 3.

Figure 2:
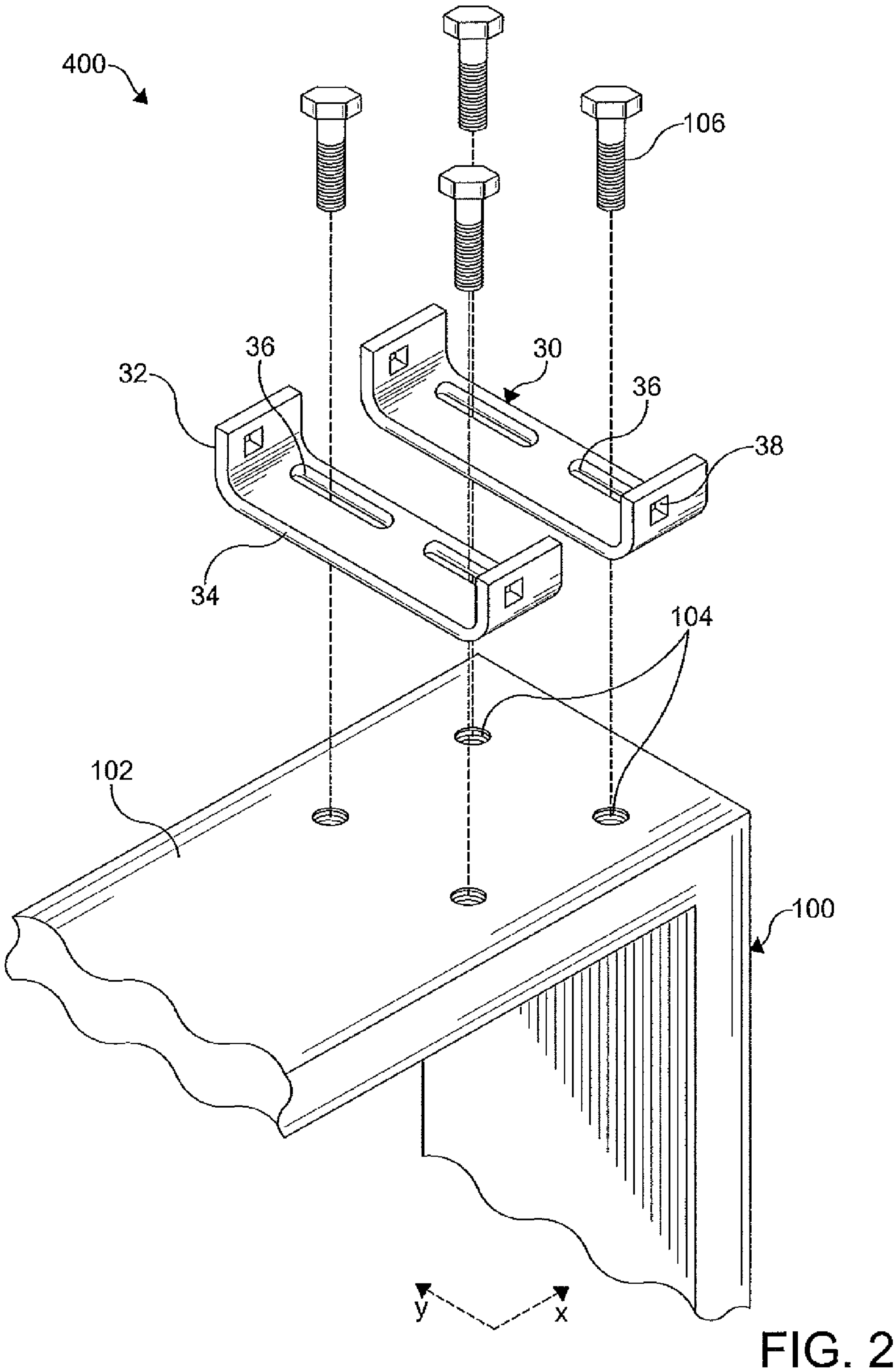
FIG. 2 is a perspective view illustrating the interaction between the adapter kit of FIG. 1 and a structural frame of a car of an elevator installation.

As shown in FIG. 2, the lower brackets 30 are transversely aligned and laterally spaced so that each of the elongate slots 36 coincides with an existing bolt hole 104 in the cross beam 102 of the car frame 100 within the elevator installation 400. Hex-head screws 106 are introduced through the slots 36 and into the existing bolt holes 104. At this stage the screws 106 are not secured tightly so as to allow transverse movement of the lower brackets 30 relative to the cross beam 102.

Figure 3:
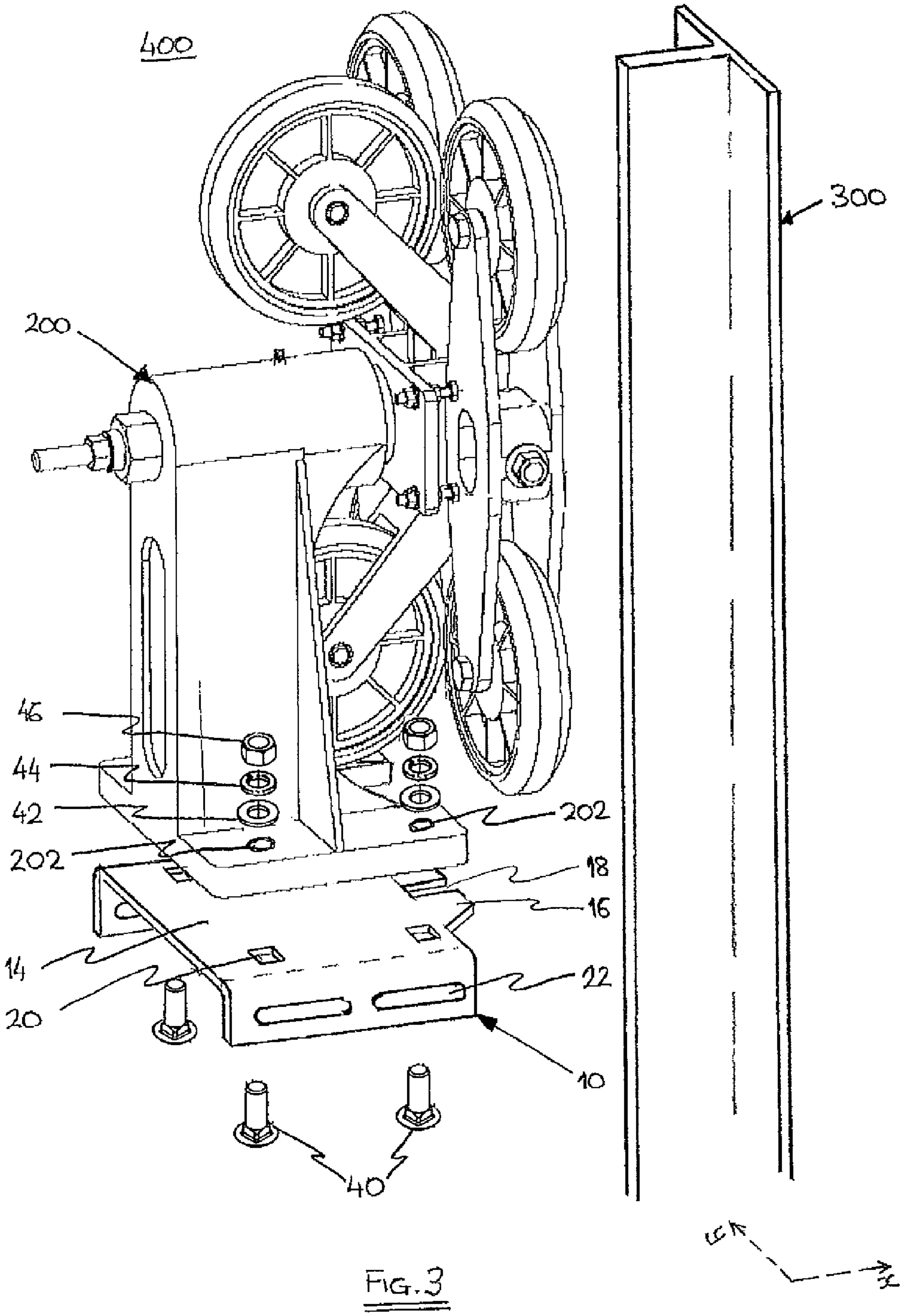
FIG. 3 is a perspective view illustrating the interaction between a roller guide in an elevator installation and the adapter kit of FIG. 1.

As illustrated in FIG. 3, carriage bolts 40 are introduced through the bolt holes 20 in the upper bracket and through corresponding holes 202 in the base of the roller guide 200. A washer 42, a lock washer 44 and a hex nut 46 are introduced to each of the carriage bolts 40 to fasten and secure the roller guide 200 to the upper bracket 10 of the adapter kit 1.

The upper bracket 10 is then lowered over the lower brackets 30 as described previously with respect to FIG. 1 and the ensemble of the roller guide 200 and the adapter kit 1 can be moved transversely via the engagement of the untightened screws 106 in the elongate slots 36 of the lower brackets 30. When the roller guide 200 is in the correct transverse alignment with the guide rail 300, the upper bracket 10 and attached roller guide 200 are lifted from the lower brackets 30. The hex-head screws 106 are then tightened to fasten and secure the lower brackets 30 to the cross beam 102 of the car frame 100 thereby fixing the transverse position of the adapter kit 1 and roller guide 200.

Next, the upper bracket 10 and attached roller guide 200 are again lowered over the lower brackets 30 and the carriage bolts 40 are introduced through the bolt holes 38 of the lower brackets 30 and the elongate slots 22 of the upper bracket 10 as described previously with respect to FIG. 1. The roller guide 200 is moved towards the guide rail 300 until it is in the correct lateral position so that the guide rail 300 extends at least partly into the channel 18 provided between the two projections 16 extending from the web 14 of the upper bracket 10. Then the washers 42, lock washers 44 and hex nuts 46 are introduced to each of the carriage bolts 40 to fasten and secure the upper bracket 10 to the lower brackets 30, thereby fixing the lateral position of the adapter kit 1 and roller guide 200.

The procedure outlined above is repeated in respect of the three additional corners of the car frame 100. It should be noted that not only do the adapter kits 1 enable lateral and transverse adjustment of the position of the new roller guides 200 before they are finally fixed in position, but since each of the opposing guide rails 300 is at least partially accommodated in the channel 18 provided between the projections 16 of an associated upper bracket 10, the adapter kits 1 act to seismically retain the frame on the guide rails 300 even in the event of an earthquake.

Figure 4:
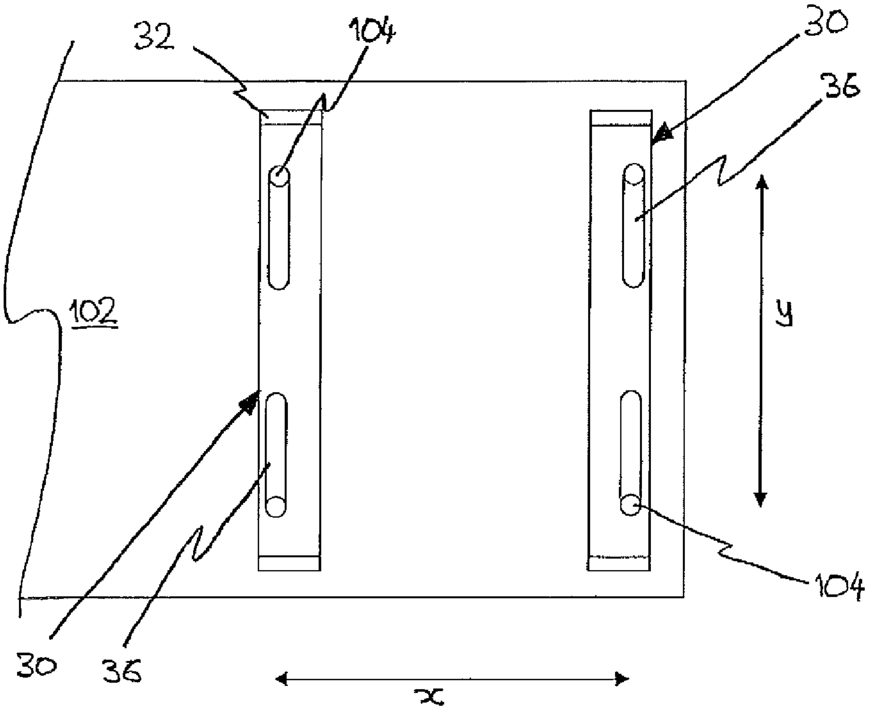
FIG. 4 is a plan view illustrating the adapter kit of FIG. 1 adjusted to accommodate a maximum bolt hole range.
Figure 5:
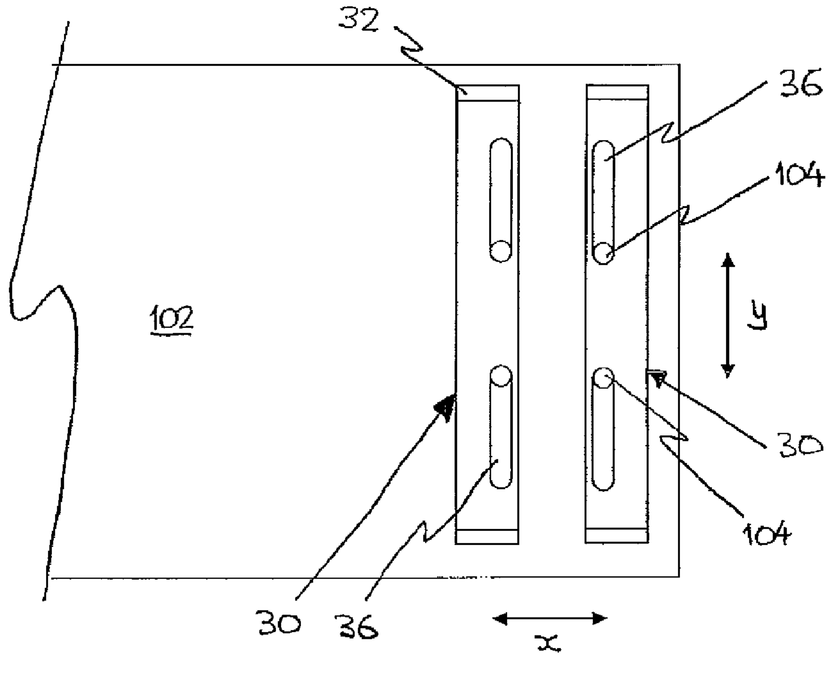
FIG. 5 is a plan view similar to FIG. 4 illustrating the adapter kit of FIG. 1 adjusted to accommodate a minimum bolt hole range.

FIG. 4 and FIG. 5 illustrate the broad range of existing bolt hole patterns 104 that a given adapter kit 1 can accommodate. Since the lower brackets 30 are independent there is no theoretical limit to the extent of lateral displacement x therebetween. However, in practice, the majority of existing guides use a square bolt hole pattern or formation (as shown) with the four holes 104 arranged at the corners of a square. With this in mind, FIG. 4 shows the maximum hole pattern spread for the lower brackets 30. The holes 104 in the cross beam 102 of the frame 100 are aligned with the outer extremities of the corresponding slots 36 in the lower brackets 30. It is envisaged that the adapter kit 1 should accommodate a maximum hole pattern area of 190.5 mm×190.5 mm (7½"×7½"). As illustrated in FIG. 5, for the minimum hole pattern is provided for when the holes 104 in the cross beam 102 of the frame 100 are aligned with the inner extremities of the corresponding slots 36 in the lower brackets 30. It is envisaged that the adapter kit 1 should accommodate a minimum hole pattern area of 89 mm×89 mm (3½"×3½").

Figure 6:
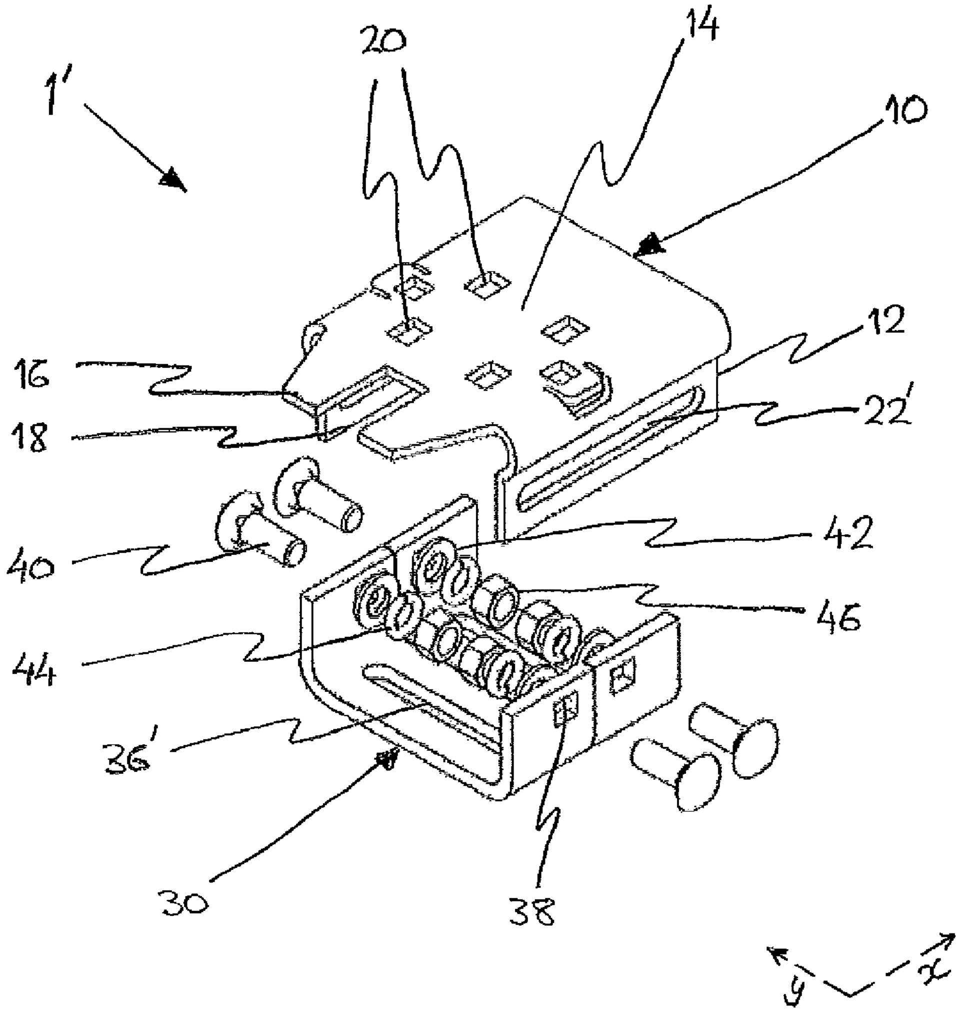
FIG. 6 is a perspective view of one embodiment of an adapter kit according to the present invention.

FIG. 6 shows an alternative adapter kit 1' configured to interface a new roller guide with an existing bolt hole pattern in a cross beam of an elevator counterweight frame. Since the arrangement of the counterweight frame for guidance along its associated guide rails is essentially the same as that of the car frame for guidance along its associated guide rails, reference is made to FIGS. 2 and 3 and associated description, where citations to car and car frame can be interchanged for counterweight and counterweight frame, for understanding the procedure for mounting the guide to the counterweight frame using the adapter kit 1' of the present embodiment.

The adapter kit 1' for the counterweight frame is essentially a smaller version to the car adapter kit 1. However, there are some notable differences. When the upper bracket 10 is lowered over the lower brackets 30, the opposing walls 12 of the upper bracket 10 lie adjacent but internal to the opposing walls 32 of the lower brackets, respectively. Accordingly, the carriage bolts 40 are inserted from outside and into the adapter kit 1' whereas in the preceding embodiment the carriage bolts 40 were inserted in the opposite direction from inside and out from the adapter kit 1. Furthermore, rather than having two elongate slots 22 in each wall of the upper bracket and two elongate slots 36 in each of the lower brackets, a single slot 22' is provided in each wall 12 of the upper bracket 10 and a single slot 36' is provided in the web 34 of each lower bracket 30. Preferably, the counterweight adapter kit 1' is designed to accommodate hole pattern areas of between 51 mm×51 mm (2"×2") and 108 mm×108 mm (4¼"×4¼").

Figure 7:
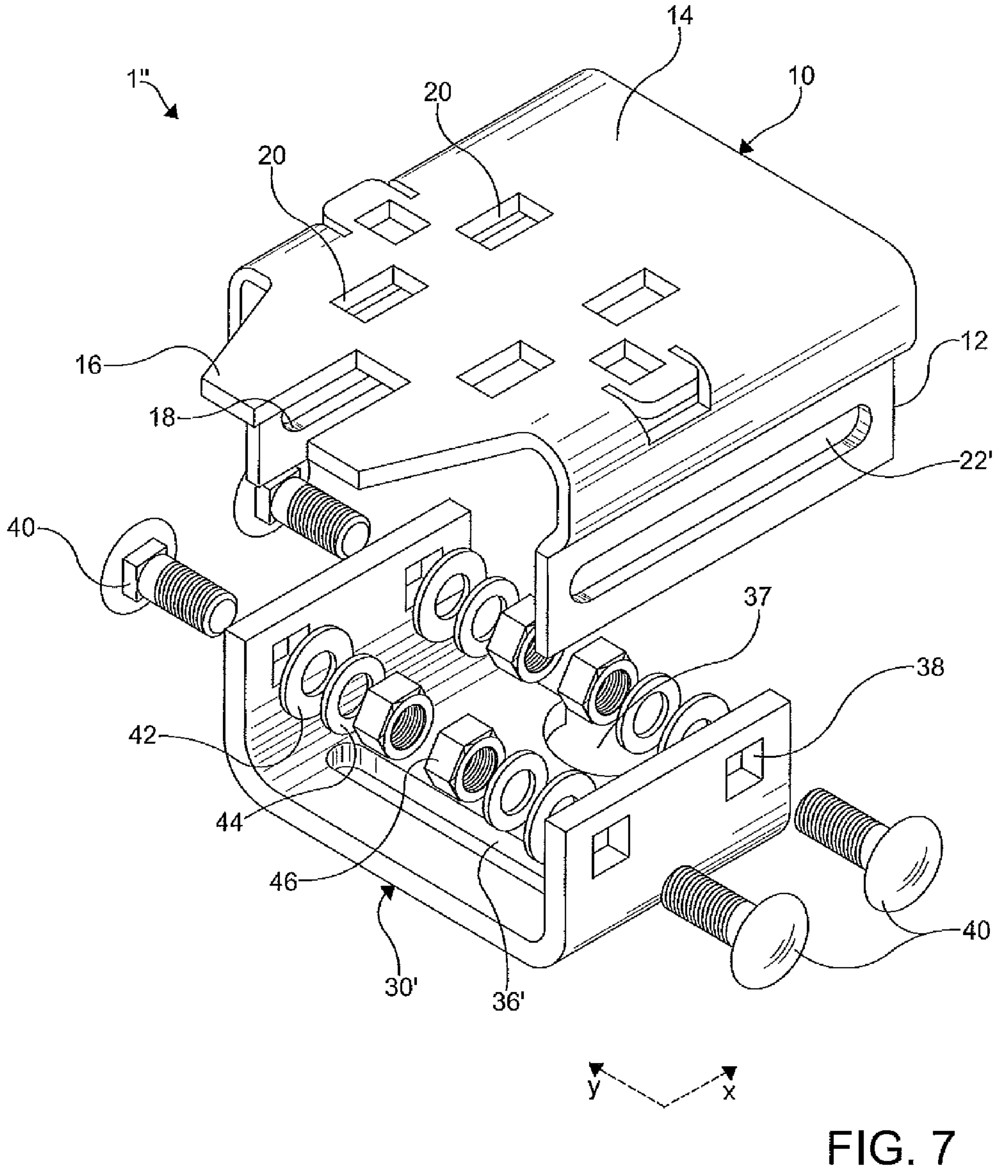
FIG. 7 is a perspective view of one embodiment of an adapter kit according to the present invention.

FIG. 7 illustrates a further adapter kit 1" configured to interface a new roller guide with an existing bolt hole pattern in an cross beam of an elevator counterweight frame. The upper bracket 10 is identical to that already shown and described with reference to FIG. 6. The principle difference between the present embodiment and that of FIG. 6 is that a single lower bracket 30' is implemented. The single lower bracket 30' is formed by two opposing walls 32 interconnected by a web 34. A single elongate slot 36' extending between the opposing walls 32 is provided in the web 34 to enable attachment of the lower bracket 30 to the upper cross beam of the elevator counterweight frame. Whereas the lower brackets 30 of the previously embodiments were fastened by screws 106 to four bolt holes 104 in the cross beam of the frame, in the present embodiment, screws 106 may be inserted through the single slot 36' to secure the lower bracket 30' to two transversely aligned bolt holes 104 in the counterweight frame 100. Furthermore, two bolt holes 38 are provided in each of the opposing walls 32 of the lower brackets 30' so, as in the previous examples, the upper bracket 10 is secured via its slots 22' to the lower bracket 36' by four carriage bolts 40. Additionally, a semi-circular cut-out 37 is formed in the lower bracket 36' to accommodate any tie-rod or other obstruction that may be present in the area that would otherwise be required to mount the lower bracket 30' to the frame.

Although the invention has been described as having particular benefit in the modernization of an existing elevator to mount new roller guides to existing bolt holes in the car and counterweight frames, it will be appreciated that the adapter kits are suitable for mounting any first component to a second component.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. An elevator installation comprising:
- a frame for movement along guide rails;
- a plurality of guides to engage with the guide rails; and
- a plurality of adapter kits to mount the guides to the frame wherein each adapter kit comprises:
- a first bracket having two opposing walls and an interconnecting web in an n-shaped profile, the web being configured for attachment to a guide by at least one fastener wherein each of the opposing walls has a slot aligned in a first direction towards one of the guide rails; and
- a second bracket having two opposing walls and an interconnecting web in a u-shaped profile with a slot provided therein extending in a second direction between the second bracket opposing walls and perpendicular to the first direction:
- wherein the second bracket is fastened through its slot to holes in the frame;
- the opposing walls of the first bracket lie adjacent to the opposing walls of the second bracket; and
- the first bracket is fastened through the slots in its opposing walls to the second bracket and the first bracket slots permit limited sliding of the first bracket relative to the second bracket in the first direction.

2. The elevator installation according to claim 1, further comprising projections extending from the webs of, and spaced from, the opposing walls of the first brackets, the projections defining channels that at least partially accommodate the associated guide rails.

3. The elevator installation according to claim 1, further comprising a third bracket having two opposing walls and an interconnecting web with a slot provided therein extending in the second direction wherein the second and third brackets are spaced apart in the first direction.

4. The elevator installation according to claim 1 wherein the opposing walls of the first bracket are positioned external to the opposing walls of the second bracket.

* * * * *